Sept. 13, 1949. S. L. EASTMAN ET AL 2,481,914
AIR COOLED REDUCTION GEAR UNIT
Filed March 2, 1944 2 Sheets-Sheet 1

INVENTORS
SIDNEY L. EASTMAN and
CLAIR M. JOHNS
BY
Oberlin, Limbach & Day
ATTORNEYS Sept. 13, 1949.   S. L. EASTMAN ET AL   2,481,914
AIR COOLED REDUCTION GEAR UNIT
Filed March 2, 1944                                2 Sheets-Sheet 2
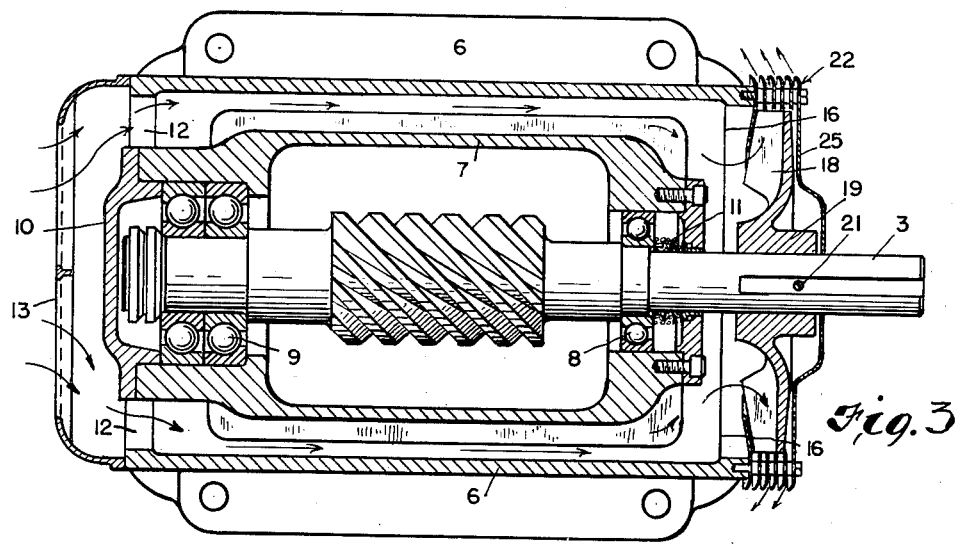
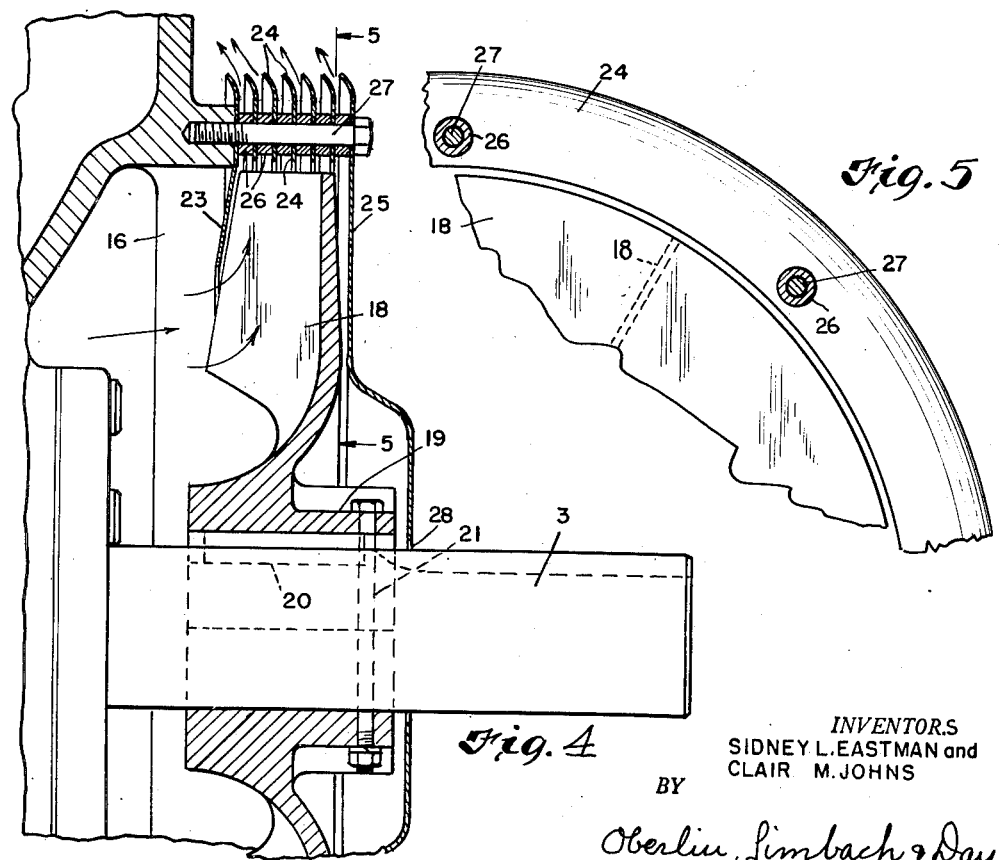
INVENTORS
SIDNEY L. EASTMAN and
CLAIR M. JOHNS
BY
Oberlin, Limbach & Day.
ATTORNEYS Patented Sept. 13, 1949

2,481,914

UNITED STATES PATENT OFFICE 2,481,914

AIR-COOLED REDUCTION GEAR UNIT

Sidney L. Eastman, Cleveland Heights, and Clair M. Johns, Cleveland, Ohio, assignors to The Cleveland Worm & Gear Company, Cleveland, Ohio, a corporation of Ohio Application March 2, 1944, Serial No. 524,706

4 Claims. (Cl. 74—606)

The present invention relates to a worm and gear power transmitting reduction unit in which air circulating or cooling means are provided for the purpose of maintaining the operating temperature of the unit within safe limits and coincidentally increasing the power rating, efficiency and durability of the unit. Worm gear reduction units have heretofore been air cooled by means of a blower fan mounted on either end of the worm shaft, such as exemplified in G. H. Acker prior U. S. Patents Nos. 1,564,742 and 2,113,868. In such instances, however, the air stream from the blower fan, which is directed past the gear unit housing walls, is itself elevated in temperature due to the compressive action of the fan, before it even comes in contact with the housing walls. Furthermore, where a blower fan is mounted upon the thrust bearing end of the worm shaft, i. e., on the end opposite to the power coupling, not only is an extra oil seal required for the shaft passing through the housing wall, but also the more efficient cooling of the thrust bearing is prevented due to the shrouding effect of the fan and its hub. A blower fan on the coupling end of the worm shaft necessarily results in the transmission of the hotter air to the zone in which the thrust bearing is located in the housing.

Inasmuch as the thrust bearing and the thrust bearing end of the worm shaft is one of the zones of maximum heat generation in a worm gear reduction unit, the problem of adequately and efficiently cooling this particular zone has heretofore been a major one confronting workers in this art.

It is, therefore, the general object and nature of our invention to provide an air cooling structure for a reduction gear unit wherein the above-mentioned disadvantages are overcome, and the coolest portion of the circulating air stream is first caused to come in contact with the worm shaft thrust bearing end portion of the unit housing. A further object of our invention is to provide an exhausting type fan mounted upon the coupling end of the worm shaft, thereby eliminating any shrouding of the thrust bearing end of the shaft, as well as the necessity for oil seals on each end of the shaft.

Another object of our invention is to provide an air cooling structure in which the additions to the over-all dimensions of the reduction gear unit proper are kept at a minimum, resulting in a compactness and relative simplicity of the unit as a whole.

Still another object of the invention is to provide a housing or shield for the air exhausting fan, which serves the dual function of providing a fan operating casing, as well as air discharge directing means for expelling the exhaust air in a direction substantially at right angles to the axis of the worm shaft, whereby such exhaust air will not interfere with any cooling air current circulated through an electric drive motor connected to the unit.

Our invention also provides a centrifugal fan for exhausting the cooling air stream whereby the unit may be operated in opposite directions of rotation without effecting or impairing the air circulating and cooling function.

Additional objects and advantages of our invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 3 is a sectional view taken upon a plane normal to that of Fig. 2 and substantially through the axis of the worm shaft;

Fig. 4 is an enlarged, detailed, sectional view of the exhausting fan and shield; and Fig. 5 is a detailed view taken substantially along line 5—5 of Fig. 4.

Figure 2:
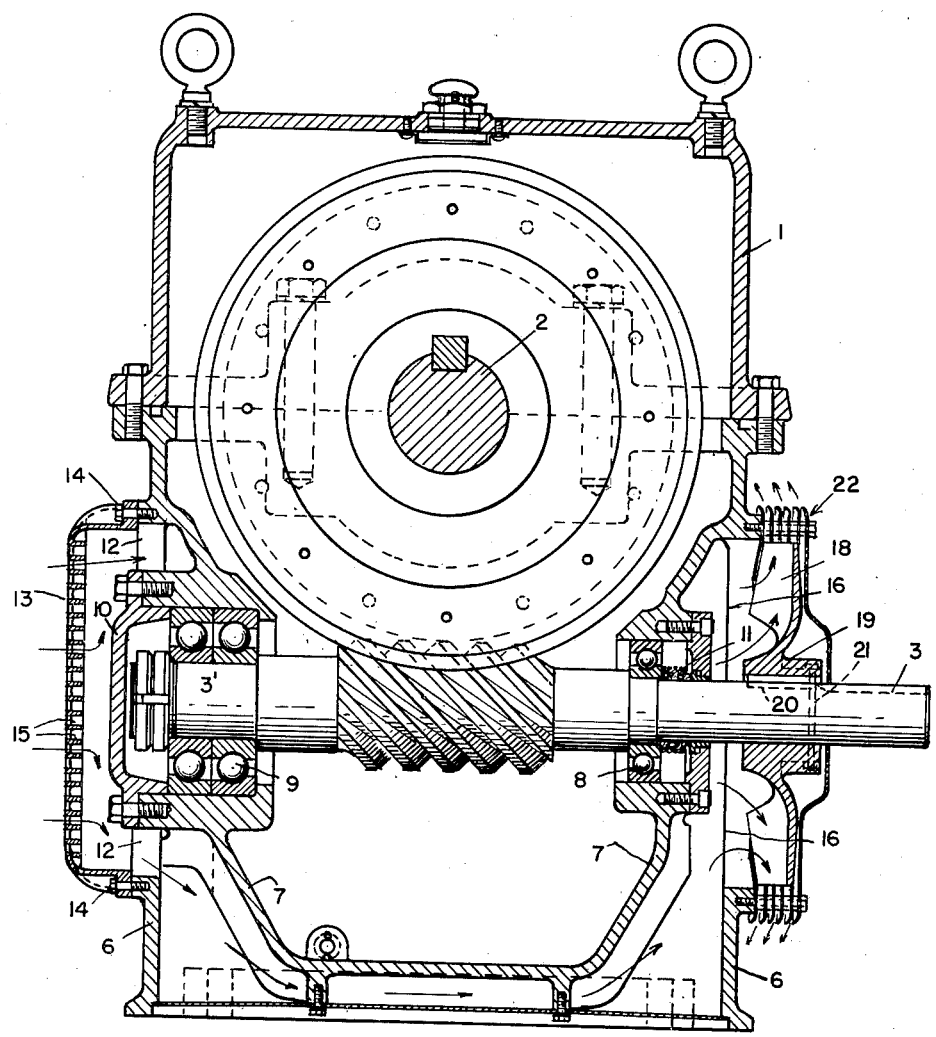
Fig. 2 is an enlarged, vertical, sectional view of our reduction gear unit.

Now referring more particularly to the drawing, there is shown therein a worm gear reduction unit consisting of the housing 1 supporting the worm wheel shaft 2 and the worm shaft 3. The worm shaft 3 is connected through the coupling 4 to the electric drive motor 5.

The lower portion of the gear unit housing is composed of the outer wall 6 and the inner wall 7, which are spaced from each other, forming an enclosed air circulation space running from end to end of the unit, and in a direction parallel to the worm shaft 3, as will be best seen by reference to Fig. 3. The inner wall 7 forms a lubricant supply reservoir and also has mounted therein the radial bearing 8 and thrust bearing 9 in which the worm shaft 3 is journaled. The left-hand end 3' of the worm shaft 3 terminates at the two-way thrust bearing 9 and hence it is closed off or capped with respect to the inner housing wall 7, by means of the bearing cap 10. The right-hand end of the shaft 3' projects out through the inner housing wall 7 and is sealed with respect thereto by means of the oil seal or packing gland 11.

An annular opening indicated at 12 is provided in the outer housing wall 6 and surrounding the thrust bearing 9 and bearing cap 10. By referring to Figs. 2 and 3, it will be seen that the opening 12 communicates with the space between the inner and outer walls 6 and 7.

A circular intake shield or guard 13 fits over the annular opening 12 and is attached to the outer housing wall by means of the screws 14. The shield 13 is composed of a plurality of grid bars 15 which are vertically spaced from each other and are relatively wide or flattened in a direction normal to the plane of the opening 12. Thus, as represented in Fig. 2, the incoming air stream through the shield 13 is divided into a plurality of smaller streams which are of increased velocity due to the restrictive effect of the bars 15, and such air streams being also caused to impinge against the thrust bearing cap 10 substantially as indicated by the arrows in Fig. 2. A circular opening 16 is provided in the right-hand portion of the outer housing wall 6. This opening 16, as will best be seen from Fig. 3, has a diameter substantially equal to the maximum distance between the inner faces of the longitudinal sides of the outer housing wall 6. Immediately adjacent the opening 16, there is located the exhausting fan 18 whose split hub 19 is fastened to the shaft 3 by means of the flat key 20 and clamping bolts, such as indicated at 21. A circular exhaust fan shield, indicated generally at 22, surrounds and encloses the fan 18. The shield 22 is composed of a plurality of sheet metal plates 23, 24 and 25 which are spaced apart from each other by means of the spacing washers 26 on the mounting bolts 27 which fasten the assembled shield to the housing wall.

It will be seen that the innermost plate 23 extends parallel to and radially inwardly of the periphery of the blades of the fan 18, thus providing a confining housing aiding in the centrifugal air propelling action of the fan. The outermost plate 25 encloses the other side of the fan 18, as well as its hub 19 and has a central opening 28, slightly clearing the worm shaft 3. The intermediate plates 24 extend from beyond the periphery of the blades of the fan 18, and thus provide directing louvres guiding the direction of discharge of air from the fan 18. It will be noted that the outer peripheral portions of the plates 23, 24 and 25 are slightly "dished" or curved toward the housing wall 6. This conformation of the outer peripheries of plates 23, 24 and 25 not only aids in the direction of the discharging air stream, as indicated by the arrows in Figs. 2, 3 and 4, but also serves as a baffle preventing foreign objects, such as paper, rags, pieces of metal and the like, from being dropped into the spaces between the plates.

Figure 1:
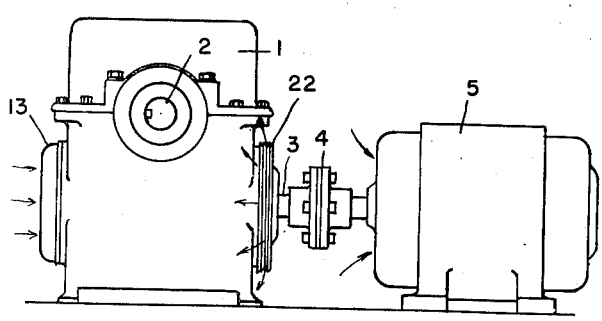
Fig. 1 is an elevational view of a worm gear unit constructed according to the principle of our invention shown connected to an electric drive motor.

It will thus be seen that the relatively cooler air is drawn in through the intake guard 13, through the opening 12, against the thrust bearing cap 10, around the thrust bearing 9, and thence along the inner housing wall 7, thus imparting a cooling action not only to the thrust bearing 9, but also to the lubricant contained within the inner housing wall 7. The cooling air stream then passes out through the opening 16, through the fan 18 and is discharged in a substantially radial direction between the plates 24. As will best be seen from Fig. 1, in which the drive motor 5, as represented by the arrows, is shown as itself drawing in a stream of cooling air, the direction of discharge of the exhaust air from the shield 22 does not interfere with the cooling air intake action of the drive motor. It will be equally obvious that in the event of an opposite rotational drive of the unit that the discharge of air from the shield 22 will remain the same, and even if the direction of air flow through the drive motor 5 is reversed, there still will be no conflict between the cooling air streams of the respective reduction gear unit 1 and of the drive motor 5.

The exhaust fan shield assembly possesses the further advantage in that the intermediate plates 24, being symmetrical in cross-sectional contour with respect to each other, can be conveniently reversed in their mounting upon the bolts 27 so that their dished outer peripheries will be directed in a right-hand direction (e. g. with respect to Fig. 4). In this manner, a change in the deflecting action of the plates 24 may be simply obtained, if it is desired to have the exhausting air stream which is discharged in a generally radial direction with respect to the shaft 3 deflected outwardly away from the vertical side wall of the housing unit 1.

Other modes of applying the principle of the invention may be employed, change being made as regards the details described, provided the features stated in any of the following claims or the equivalent of such be employed.

We therefore particularly point out and distinctly claim as our invention:

1. In an air cooled worm gear reduction unit, a housing comprising inner and outer walls forming an air circulating space therebetween extending from end to end thereof, a worm shaft having one end projecting from said housing and the other end enclosed within said inner wall, a two-way thrust bearing in such inner wall for such enclosed end of said shaft, a radial bearing for said shaft where the latter projects from said housing, an oil seal for said shaft in said inner housing wall where said shaft thus projects therethrough, an air intake opening in such outer wall spaced directly axially from said thrust bearing, a grid shield for said intake opening comprising a plurality of grid bars flattened in a plane normal to the plane of said opening, an air outlet opening in such outer wall surrounding said shaft projecting therefrom, an air exhausting fan mounted on such projecting end portion of said shaft and adjacent said air outlet opening operative to draw air into said intake opening directly against such inner wall axially of said thrust bearing and then through said air circulating space and out said outlet opening, and deflector means adapted to direct such exhaust radially outwardly of said fan.

2. In an air cooled worm gear reduction unit, a housing comprising inner and outer walls forming an air circulating space therebetween extending from end to end thereof, a worm shaft having one end projecting from said housing and the other end enclosed within said inner wall, a thrust bearing in such inner wall for such enclosed end of said shaft, an air intake opening in such outer wall spaced directly axially from said thrust bearing, an air outlet opening in such outer wall surrounding said shaft projecting therefrom, and an air exhausting fan mounted on such projecting end portion of said shaft and adjacent said air outlet opening operative to draw air into said intake opening directly against such inner wall axially of said thrust bearing and then through said air circulating space and out said outlet opening.

3. In an air cooled worm gear reduction unit, a housing comprising inner and outer walls forming an air circulating space therebetween extending from end to end thereof, a worm shaft having one end projecting from said housing and the other end enclosed within said inner wall, a bearing for said other end of said shaft in such inner wall, an air intake opening in such outer wall spaced directly axially of such end of said shaft, an air outlet opening in such outer wall surrounding said shaft projecting therefrom, and an air exhausting fan mounted on such projecting end portion of said shaft and adjacent said air outlet opening operative to draw air into said air intake opening directly axially of the end of said shaft and then through said air circulating space and out said outlet opening.

4. In an air cooled worm gear reduction unit, a housing comprising inner and outer walls forming an air circulating space therebetween extending from end to end thereof, a worm shaft having one end projecting from said housing and the other end enclosed within said inner wall, a two-way thrust bearing in such inner wall for such enclosed end of said shaft, a radial bearing for said shaft where the latter projects from said housing, an oil seal for said shaft in said inner housing wall where said shaft thus projects therethrough, an air intake opening in such outer wall spaced directly axially from said thrust bearing, an air outlet opening in such outer wall surrounding said shaft projecting therefrom, an air exhausting fan mounted on such projecting end portion of said shaft and adjacent said air outlet opening operative to draw air into said intake opening against such inner wall axially of said thrust bearing and then through said air circulating space and out said outlet opening.

SIDNEY L. EASTMAN.
CLAIR M. JOHNS.

REFERENCES CITED

The following references are of record in the file of this patent:

UNITED STATES PATENTS

| Number | Name | Date |
|---|---|---|
| 1,759,415 | Perlesz | May 20, 1930 |
| 2,113,868 | Acker | Apr. 12, 1938 |
| 2,136,254 | Sargent | Nov. 8, 1938 |
| 2,142,834 | Bergstrom | Jan. 3, 1939 |
| 2,352,485 | Kritzer | June 27, 1944 |

FOREIGN PATENTS

| Number | Country | Date |
|---|---|---|
| 420,927 | Great Britain | Dec. 11, 1934 |
| 425,425 | Great Britain | Mar. 14, 1935 |
| 476,724 | Great Britain | Dec. 14, 1937 |
| 549,619 | Great Britain | Nov. 30, 1942 |